United States Patent Office 2,780,638
Patented Feb. 5, 1957

2,780,638

SYNTHESIS OF SUCCINONITRILES

George W. Ayers, Chicago, and William L. Fierce, Algonquin, Ill., assignors to The Pure Oil Company, Chicago, Ill., a corporation of Ohio No Drawing. Application July 15, 1955,
Serial No. 522,392

10 Claims. (Cl. 260—465.3)

This invention relates to the preparation of saturated dinitriles through the reaction of cyanogen and olefins. More particularly, this invention is related to the high temperature addition of cyanogen to the double bond of an olefin to prepare saturated dinitriles.

Dinitriles have found extensive use in various industries, particularly as intermediate materials in the preparation of important organic chemicals, such as dicarboxylic acids, imines, diamines, dialdehydes, and diamides. Nitriles and dinitriles or their hydrolysis products often are starting materials in the preparation of polymeric or higher condensation products such as nitrile rubber, acrylo-polymers and resins for the paint industry.

Heretofore it has been necessary to prepare dinitriles by processes involving more than one step. In many cases the yields have been low on account of side reactions. Attempts have been made heretofore to use cyanogen as a starting material in a one-step preparation of dinitriles from well-known, inexpensive, and easily available materials, such as olefins, but such attempts have been unsuccessful.

We have found unexpectedly that succinonitrile, a saturated dinitrile, may be easily prepared in a one-step process by the passage of a mixture of cyanogen and ethylene in vapor form over a very hot catalytic metal surface with quench-cooling of the reacted vapors and recovery of succinonitrile therefrom. Where olefins other than ethylene are used, corresponding saturated dinitriles, which are substituted succinonitriles, are obtained in substantial quantity in this simple manner.

Accordingly, it is an object of the present invention to provide a simple and direct process for the manufacture of saturated dinitriles.

Another object of this invention is to provide a process for effecting the direct addition of cyanogen to the double bond of an olefin.

A further object of this invention is the provision of a catalytic, high-temperature process for the preparation of succinonitrile in substantial yield.

A still further object of this invention is to provide a process for reacting cyanogen and an olefin in gaseous form at high temperature in the presence of a selected metallic heating element to produce a corresponding saturated dinitrile.

Further objects of this invention, some of which are referred to hereinafter, will be apparent to those skilled in the art to which this invention pertains.

In general, therefore, our invention deals with a process whereby a saturated dinitrile is prepared at high temperatures utilizing an extremely short residence time, gaseous reactants comprising one or more olefins and cyanogen, and a specific type of catalytic metal or alloy in extremely hot condition. More particularly, therefore, our invention comprises passing a mixture of cyanogen and an olefin in gaseous form over a glowing "nichrome" alloy surface at about 1500° F. or above, followed by rapid quenching in unreacted gas to prevent degradation of the desired products and formation of undesired side products.

The hydrocarbons which may be utilized in accordance with this invention are those hydrocarbons of two or more carbon atoms containing one double bond, such as ethylene, propylene, butylene and the like. The number of carbon atoms in the olefin may vary from two on up indefinitely, but at the reaction temperature the olefin is present in a gaseous form. Mixtures of olefins or mixtures of olefins with saturated and/or aromatic hydrocarbons are also utilizable. The olefins, or hydrocarbon mixtures containing olefins, are ordinarily obtained from hydrocarbon petroleum cracking processes by standard methods. Thus, for example, in the refining of a hydrocarbon petroleum oil, such as a Mid-Continent crude, for the production of gasoline by cracking, large volumes of mixed gases are evolved which contain considerable proportions of olefins. These olefins are mainly low molecular weight mono-olefins and after suitable separation or concentration may be utilized in the process of this invention.

Cyanogen, also known as ethane dinitrile, dicyanogen and oxalonitrile, is a colorless, extremely toxic gas of high stability having utility in certain chemical syntheses and other chemical reactions. It has the formula NC—CN, which is also expressed as $(CN)_2$. Cyanogen as utilized in the process of this invention may be prepared by any one of a number of processes, such as the treatment of sodium cyanide or potassium cyanide with copper sulfate, the heating of mercuric cyanide or silver cyanide, or reacting hydrogen cyanide with chlorine gas at higher temperatures. Cyanogen obtained from any one of these processes is satisfactory for use in the process of this invention.

The preferred catalytic heating surface used in this process in an alloy containing nickel and chromium, with or without other elements such as iron, manganese and carbon. Nichrome wire or ribbon, containing 75% nickel, 12% iron, 11% chromium and 2% manganese is especially effective. Other good catalytic heating surfaces comprise Nichrome IV (80% nickel and 20% chromium), Chromel A (80% nickel and 20% chromium), Chromel C (61% nickel, 23% iron and 16 chromium), Tophet C (60% nickel, 28% iron and 12% chromium), Nichrome (60% nickel, 24% iron, 16% chromium, with 0.1% carbon) and Nichrome castings (60% nickel, 25% iron, 15% chromium, with 0.7% carbon). Metals and alloys suitable for this process and which do not melt or vaporize at temperatures up to about 2000° F., may comprise one or more of the following metals: chromium, nickel, tantalum, tungsten, molybdenum, vanadium, manganese, iron, cobalt, platinum, palladium, osmium, ruthenium, rhodium, iridium, beryllium, titanium, zirconium, copper and gold. Other examples of less common metals which may be used at the high temperatures specified for the instant process are hafnium, scandium, thorium, yttrium, rhenium, and niobium. The metal or metal alloy may be in any suitable shape to transmit heat rapidly in intimate contact with the gaseous mixture passing thereover. One suitable form for the metal is as a spiral or coil of wire through which the gas passes. A wire grid is also suitable. The wire may be heated to required temperatures by any suitable means, as by the application, for example, of electrical energy, that is, running a current of electricity therethrough where the electrical resistance of the metal or alloy is sufficiently high to achieve the desired temperature.

Other means of achieving the high temperatures necessary for this process may be utilized in lieu of the above-described heated coil or other heated catalytic surfaces. Thus, a regenerative type of furnace, such as, for example, the type effective for the fixation of nitrogen, commonly referred to as a pebble heater, may be utilized in the synthesis of the dinitriles from olefins and cyanogen. In the usual type of pebble heater the pebbles (or balls, fragments, chips, or the like) are of various materials, such as refractories. However, in carrying out the process of our invention, when utilizing a pebble heater the pebbles may be prepared from the solid metals or metal alloys listed above, or the metals or metal alloys may be coated upon the pebbles prepared from other materials, such as high temperature refractories and ceramics.

Our process comprises first mixing the cyanogen in gaseous form with the olefin or the mixture of olefins in gaseous form in any suitable manner, such as, for example, merely introducing each to the inlet and thence to the glowing catalytic surface or introducing each to a closed vessel and allowing the molecular activity to cause sufficient intermixing and diffusion of the components. Other suitable means include circulating the gases in the presence of a moving fan, paddle or blade which aids interdispersion of the gases. The olefin or olefins and cyanogen may be admixed in any desired volume or ratio, but preferably, to avoid the cost of heating a non-utilizable portion of olefins, the mixture should be regulated so that there is present a small, calculated theoretical excess of cyanogen, that is, cyanogen in slight excess of that needed to add to all double bonds in all the olefins present. A suitable volume ratio, for example, is ethylene to cyanogen in a ratio of 1:1. To demonstrate the wide flexibility of ratios of ethylene to cyanogen, however, a volume ratio of 1:20 is utilizable, as well as a ratio of 20:1. Other olefins may be utilized in the same or different volume ratios to cyanogen. Thus, as another non-limiting example, propylene may be utilized in a volume ratio of 20:1 with cyanogen, or in a ratio of 1:20.

After admixing, as the second step of our process, the gaseous mixture is passed over the metal or metal alloy surface, such as Nichrome coiled wire, which is glowing hot and at a reaction temperature of at least about 1500° F. The optimum reaction temperature varies somewhat depending upon the olefin or olefins utilized and the ratio of the olefin or olefins to the cyanogen in the gas mixture. In general, the higher the molecular weight of the olefin, the lower the optimum reaction temperature, which is always above about 1500° F. Temperatures as high as 2000° F. and above may be utilized in the process of our invention. The contacting time of the gaseous mixture with the metal or metal alloy which has been preheated to the reaction temperature should be at least sufficient to bring about the desired reaction between the gaseous reactants. Since the reaction is almost instantaneous, only a very short residence time, a small fraction of a second, is necessary. However, the residence time of the gas may be considerably longer, but a residence time below about 0.4 second is preferred to minimize carbonization of reactants and the concomitant production of decomposition products of succinonitrile. Thus, as a non-limiting example, where a volume ratio of ethylene to cyanogen of 1:1 is utilized over a Nichrome wire electrically heated to about 1500° F., and where the wire is of 6.2 sq. in. surface area, a flow rate of entry of the gaseous mixture to the reaction chamber and over the surface of the Nichrome wire coil may be 0.011 cu. ft. per minute. Another suitable non-limiting example of flow rate under the above conditions is 0.02 cu. ft. per min. The reaction zone or chamber may be of any suitable form, shape, and construction. As a non-limiting example, it may be a glass chamber having an inlet and outlet at opposite ends and the metal or metal alloy surface disposed intermediate to the ends. The tube may optionally also have a bottom drain-off for removing condensed products.

As the gas mixture flows over the surface of the heated, glowing coil of metal or metal alloy, the cyanogen reacts with the olefin and adds to the double bond to form a saturated dinitrile in appreciable quantity. Thus, a typical reaction is represented by the following:

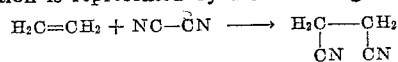
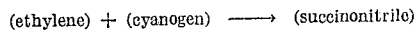

(ethylene) + (cyanogen) ⟶ (succinonitrile)

As the reaction proceeds, a condensate collects in the bottom of the reaction chamber and may be removed. At room temperature, the condensate forms a black pasty mass. To facilitate condensation, after passage over the glowing metal or metal alloy surface the gas mixture may optionally be removed from the treating zone and subjected to a temperature-lowering procedure to further separate condensables formed during the reaction between the cyanogen and olefin and still carried by the gases. The unreacted gas mixture after removal of the condensables may be recycled, if desired, to the treating zone or may be used as quench gas. The method of condensing the condensables from the gas mixture after it has contacted the glowing metal or metal alloy surface may be any standard method, such as by metal cooling fins in direct or indirect contact with water-cooled coils.

The condensate, cooled as mentioned above, forms a black pasty mass at room temperature. This mass contains the saturated dinitrile in substantial amount. The dinitrile may be removed easily from the pasty mass by any suitable method, for example, by extraction with hot water where the saturated dinitrile is water-soluble. The aqueous solution of the saturated dinitrile, such as succinonitrile, may be concentrated by suitable means from solution, such as by fractional distillation or extractive distillation, and the dinitrile obtained in purified form.

An important factor in our process is the contacting of the mixture of olefin, or olefins, and cyanogen with the glowing metal or metal alloy surface for a short time, preferably only a small fraction of a second. The manipulative technique is such that immediately after the contacting and reaction at the hot, catalytic surface, the reacted gas containing the products flows away from the metal or metal alloy surface and is instantly cooled or quenched to a much lower temperature by the gas mixture surrounding the metal surface which has not yet come in contact with the metal surface. The contacted gases immediately (a second or less) drop several hundred degrees in temperature on quenching in this way to below about 1300° F. The relatively high flow rate of the gases ordinarily assures rapid contacting and removal of contacted gases from the immediate area of the hot metal in the reaction zone. This type of operation may be termed "shock-chilling" and serves to fix the reaction products, minimizing decomposition of the dinitrile formed at the hot metal or metal alloy surface and preventing other products from forming. Quenching may also be brought about by introduction of a cold stream of gas immediately following the glowing coil. This quench gas may be efflux gas from which condensate has been removed. Therefore, the particular steps utilized in our process are designed to incorporate this feature of quick contacting of reactants with the hot surface, and instant removal and cooling of reacted components. Where a pebble heater is used to maintain the temperature of the metal at the correct temperature, supplementary means of providing quick cooling of the contacted gases is resorted to. Thus, for example, an insulated refrigeration unit arranged to direct a blast of frigid gas or other cooling medium against the contacted gases may be provided.

The following examples further illustrate the process of our invention:

Example I

A mixture of 4.4 grams ethylene and 8.1 grams cyanogen, forming a volume ratio of ethylene to cyanogen of 1:1, was passed over a red-hot coil of Nichrome wire, closely coiled on a 0.2 inch diameter inside a Pyrex glass tube of 0.25 inch diameter and having an effective total length of 10 inches, which was heated electrically by connecting it through an autotransformer to a 110 volt line. The gaseous mixture was passed through the coil when the latter was a dull red color, that is, below about 1400° F., at a gas flow rate of 0.011 cu. ft. per minute, and at a gas velocity of 32.58 ft./min. A very small amount of condensate formed. After substantially all of the gas mixture had passed over the heated coil, the condensate was withdrawn from the chamber and cooled to room temperature. The gas which had contacted the coil was further cooled and the very small amount of condensate so formed was added to the condensate originally obtained. The condensate was then subjected to water extraction at 100° F. and the aqueous solution of succinonitrile so obtained was concentrated by fractional distillation of water from the solution. The yield of succinonitrile was a small fraction of the amount theoretically possible by complete reaction of the initial ethylene and cyanogen. The identity of the succinonitrile was confirmed by hydrolyzing a small portion with an excess of 20% sodium hydroxide solution. The hydrolysis produced ammonia and succinic acid, the ammonia being evolved from the solution during heating, and the succinic acid was identified by paper chromatography.

*Example II*

A mixture of 4.4 grams of cyanogen and 8.1 grams ethylene, in a volume ratio of ethylene to cyanogen of 1:1, was passed through the same heated coil of Nichrome wire in the same Pyrex tube used in Example I, but heated to above 1500° F. The flow rate of the gas mixture through the coil again was about 0.011 cu. ft./min., and the gas velocity was 32–58 ft./min. It was noted that as the gas mixture passed over the wire, a haze formed in the gas, and 3 grams of condensate collected in the bottom of the reaction vessel, which was of the same form as in Example I. Upon subjecting the condensate to water extraction as described in Example I, water-soluble succinonitrile was obtained to the extent of about 0.9 gm. or about 30% of the condensate mass. Trace quantities of acetonitrile and maleonitrile were also formed during the run. As in Example I, the aqueous solution of succinonitrile was subjected to fractional distillation to remove the water, and succinonitrile was identified by hydrolysis and paper chromatography.

Propylene under the same conditions yields methyl-succinonitrile as the chief product.

As can be seen above from Examples I and II our process is suitable for various olefins and operates efficiently above 1500° F. Little reaction occurs when a reaction temperature of only 1200–1400° F. is utilized. The residence time of the gas mixture in contact with the hot metal or alloy surfaces is kept very short, and the temperature of the contacted gases is immediately lowered by quenching with cooler gas. The process may be run as a batch operation, or on a continuous basis.

Other modifications of apparatus and the manipulative procedures for utilizing them in connection with our process are also contemplated such as are within the skill of those versed in the art.

We claim and particularly point out as our invention:

1. A process for the preparation of saturated dinitriles which comprises catalytically contacting cyanogen and mono-olefinic hydrocarbon in a reaction zone with a metallic surface heated to at least about 1500 °F.

2. Process in accordance with claim 1 in which the mono-olefinic hydrocarbon is ethylene.

3. Process in accordance with claim 1 in which the mono-olefinic hydrocarbon is propylene.

4. Process in accordance with claim 1 in which the mono-olefinic hydrocarbon is butylene.

5. The process of claim 1 in which the metallic surface comprises at least one metal selected from the group consisting of nickel, chromium, tantalum, tungsten, molybdenum, vanadium, manganese, iron, cobalt, platinum, palladium, osmium, ruthenium, rhodium, iridium, beryllium, titanium, zirconium, copper, gold, hafnium, scandium, thorium, yttrium, rhenium, and niobium, and alloys thereof.

6. The process of claim 5 in which said cyanogen is substantially pure cyanogen, and said cyanogen and mono-olefinic hydrocarbon are introduced to the reaction in a volume ratio of about 1:20–20:1 and then passed over said metallic surface at a flow rate sufficient to prevent substantial carbonization of said gaseous mixture.

7. The process of claim 6 in which said temperature is about 1500–2000° F., and the reaction mixture is immediately quenched to not more than about 1300° F. and then rapidly cooled to ordinary temperature.

8. The process of claim 7 in which said mono-olefinic hydrocarbon is ethylene in a volume ratio of about 1 to 1 volume of cyanogen, the cyanogen and ethylene are admixed in a separate zone before introduction to said reaction zone, said metallic surface is nichrome wire, said temperature is about 1500° F., the contact time at reaction temperature is a small fraction of a second, and the reaction mixture is quenched to cooler condition in a fraction of a second.

9. A process for the preparation of succinonitrile which comprises the steps of admixing ethylene and cyanogen in an admixing zone, passing said admixture over a solid, catalytic metallic surface of high heat conductivity heated to at least about 1500° F. in a reaction zone at a flow rate sufficient to prevent substantial carbonization of said admixture, quenching said contacted mixture by unreacted gas admixture to below about 1300° F. and removing condensables therefrom, further rapidly cooling said condensables in a separate cooling zone, subjecting condensed matter obtained from said gases to extraction with water in a separate extraction zone, subjecting the water extract so obtained to fractional distillation in a distillation zone and recovering therefrom succinonitrile.

10. The continuous process of preparing succinonitrile which comprises initially admixing gases comprising ethylene and cyanogen in a volume ratio of about 1:20–20:1 in a mixing zone, continuously passing said admixture to a reaction zone and over a coil of Nichrome wire heated to a temperature of at least about 1500° F., for a contact time of a fraction of a second, continuously quenching reacted gas admixture with unreacted gas mixture down to about 1300° F. in a small fraction of a second, continuously recovering from said gaseous mixture after said contacting a condensate, at least periodically recovering from said condensate succinonitrile, and continuously adding to said mixing zone sufficient ethylene and cyanogen in above-said volume ratio to maintain the concentration of reactants in said reaction zone at a substantially constant level.

References Cited in the file of this patent

UNITED STATES PATENTS

| | | |
|---|---|---|
| 2,653,963 | Cowen et al. | Sept. 29, 1953 |
| 2,666,780 | Arthur et al. | Jan. 19, 1954 |

OTHER REFERENCES

Janz: Jour. Am. Chem. Soc., vol. 74, 4529–31 (1952).